United States Patent
Sommier et al.

(10) Patent No.: US 11,746,683 B2
(45) Date of Patent: *Sep. 5, 2023

(54) DURABLE HEATING MEMBER FOR A VEHICLE EXHAUST GAS PURIFICATION DEVICE

(71) Applicant: FAURECIA SYSTEMES D'ECHAPPEMENT, Nanterre (FR)

(72) Inventors: Thomas Sommier, Belfort (FR); Matthieu Riverain, Bavans (FR); Nicolas Tur, Thonon les Bains (FR); Sébastien Hanauer, Le Haut Soultzbach (FR); Vincent Lebourgeois, Audincourt (FR)

(73) Assignee: FAURECIA SYSTEMES D'ECHAPPEMENT

( * ) Notice: Subject to any disclaimer, the term of this patent is extended or adjusted under 35 U.S.C. 154(b) by 22 days.

This patent is subject to a terminal disclaimer.

(21) Appl. No.: 17/439,046

(22) PCT Filed: Mar. 19, 2020

(86) PCT No.: PCT/EP2020/057556
§ 371 (c)(1),
(2) Date: Sep. 14, 2021

(87) PCT Pub. No.: WO2020/188016
PCT Pub. Date: Sep. 24, 2020

(65) Prior Publication Data
US 2022/0154617 A1    May 19, 2022

(30) Foreign Application Priority Data
Mar. 21, 2019 (FR) .................. 19 02950

(51) Int. Cl.
*F01N 3/20* (2006.01)

(52) U.S. Cl.
CPC ........ *F01N 3/2013* (2013.01); *F01N 2240/16* (2013.01); *F01N 2240/20* (2013.01); *F01N 2260/18* (2013.01)

(58) Field of Classification Search
CPC ............. F01N 3/2013; F01N 2240/16; F01N 2240/20; F01N 2260/18; F01N 3/027; Y02A 50/20; Y02T 10/12
See application file for complete search history.

(56) References Cited

U.S. PATENT DOCUMENTS

| | | | | |
|---|---|---|---|---|
| 5,245,825 A | * | 9/1993 | Ohhashi | H05B 3/12 422/174 |
| 2011/0030554 A1 | | 2/2011 | Gonze et al. | |

(Continued)

FOREIGN PATENT DOCUMENTS

| | | |
|---|---|---|
| CN | 101994546 A | 3/2011 |
| CN | 108691617 A | 10/2018 |

(Continued)

OTHER PUBLICATIONS

International Search Report and Written Opinion for PCT/EP2020/057556 dated Apr. 15, 2020.

(Continued)

*Primary Examiner* — Brandon D Lee
(74) *Attorney, Agent, or Firm* — Carlson, Gaskey & Olds, P.C.

(57) ABSTRACT

A heating member for a vehicle exhaust gas purification device comprises an electrically conductive peripheral frame having an inner edge, a central support arranged substantially at a geometric centre of the inner edge, and a perforated heating grid formed of a plurality of elongate heating elements each having first and second ends opposite one another. The first end is linked to the electrically conductive peripheral frame and the second end is linked to the central support. Each elongate heating element occupies (Continued)

a respective angular sector of the perforated heating grid, and is arranged in zigzag manner within that angular sector so as to form a succession of strands connected by nodes and being linked by the nodes to the elongate heating elements occupying neighbouring angular sectors.

19 Claims, 7 Drawing Sheets

(56) References Cited

U.S. PATENT DOCUMENTS

2018/0291787 A1* 10/2018 Bartolo .................... H05B 3/03
2021/0180502 A1*  6/2021 Chana ...................... F28D 9/02

FOREIGN PATENT DOCUMENTS

| FR | 3065027 A1 | 10/2018 |
| JP | S58124012 A | 7/1983 |
| JP | H04179818 A | 6/1992 |

OTHER PUBLICATIONS

Preliminary Search Report for French Application No. 19 02950 dated Dec. 9, 2019.

* cited by examiner

DURABLE HEATING MEMBER FOR A VEHICLE EXHAUST GAS PURIFICATION DEVICE

CROSS-REFERENCE TO RELATED APPLICATIONS

This application is the US national phase of PCT/EP2020/057556, which was filed on Mar. 19, 2020, which claims priority to FR 19 02950, filed Mar. 21, 2019.

FIELD OF THE DISCLOSURE

The present disclosure relates to a heating member for a vehicle exhaust gas purification device, adapted to be arranged opposite and at a distance from an upstream or downstream side of a vehicle exhaust gas purification device.

The disclosure also relates to an exhaust gas purification device supply member, an exhaust gas purification device of an internal combustion engine comprising such a heating member, an exhaust line comprising such a purification device, and a motor vehicle comprising such an exhaust line.

BACKGROUND

Exhaust lines of vehicles with internal combustion engines typically include catalytic purification devices, for example to convert NOx, CO and hydrocarbons into $N_2$, $CO_2$ and $H_2O$. Such devices are only effective when the catalytic material is at a minimum temperature.

For this purpose, purification devices have been developed which incorporate a heating member mounted opposite the upstream side of a purification member, so that the purification member is heated in an accelerated manner when the vehicle is started. FR 3 065 027 A1 describes such a purification device, in which the heating member is formed by a plurality of intersecting heating wires mounted between a peripheral frame and a central support.

However, the existing heating members are not fully satisfactory. They are not very durable and soon become damaged by the particularly aggressive conditions encountered in an exhaust line. They are also poorly suited to conduits with elliptical cross-sections, even though the layout constraints of vehicle exhaust lines often require the purification devices to be housed in such conduits.

Thus, one objective of the disclosure is to increase the durability of such heating members. Other objectives are that such heating members can be easily standardised and easily handled, that they can be easily integrated into any type of existing exhaust gas purification device, including those with an elliptical cross-section, that they have a very limited impact on the size of the exhaust line, that they can be produced by an automated process and that they allow a homogeneous and rapid heating of the purification device.

SUMMARY

To this end, the disclosure relates to a heating member for a vehicle exhaust gas purification device that is adapted to be arranged opposite and spaced from an upstream or downstream face of a vehicle exhaust gas purification device. The heating member comprises an electrically conductive peripheral frame having an inner edge with a geometric centre, a central support arranged substantially at the geometric centre, and a perforated heating grid centred on the geometric centre and extending from the central support to the electrically conductive peripheral frame. The perforated heating grid is formed of a plurality of elongate heating elements each having first and second ends opposite one another, the first end being linked to the perforated peripheral frame and the second end being linked to the central support. Each elongate heating element occupies a respective angular sector of the perforated heating grid and is arranged in zigzag manner within that angular sector so as to form a succession of strands connected by nodes and being linked by said nodes to the elongate heating elements occupying the neighbouring angular sectors.

According to particular embodiments of the disclosure, the heating member also has one or more of the following features taken in isolation or in any combination that is technically possible:
  each strand has a thickness, taken parallel to the direction of flow of the exhaust gas through the heating grid, and a width, taken perpendicular to the direction of flow of the exhaust gas through the heating grid and perpendicular to the direction of greatest dimension of said strand, the thickness being greater than the width;
  the ratio of thickness to width is greater than 1.5 and preferably greater than 2.0;
  the ratio of thickness to width is less than 10 and preferably less than 5;
  each strand of an elongate heating element occupying a given angular sector is tangent to a corresponding strand of each of the elongate heating elements occupying neighbouring angular sectors;
  the nodes are arranged on a plurality of closed contour isopotential lines and, for each node arranged on an isopotential line, the ratio of the length of said node, measured between the strands the node connects, to the cross-sectional area of said node, measured perpendicular to the length, is substantially equal to the ratio of the length to the cross-sectional area of every other node arranged on the same isopotential line;
  the strands of a single elongate heating element are evenly distributed between the central support and the peripheral frame;
  each strand is substantially constituted by a homothety, centred on the geometric centre, of the portion of the inner edge of the peripheral frame embraced by the angular sector occupied by the elongate heating element to which said strand belongs;
  each angular sector of the heating grid embraces a portion of the inner edge of the peripheral frame equal in length to the length of the inner edge embraced by each other angular sector;
  the inner edge of the peripheral frame is not circular and is preferably oval;
  the inner edge of the peripheral frame has substantially the shape of an ellipse centred on the geometric centre having a semi-major axis of length a and a semi-minor axis of length b, said inner edge being constituted by the joining of four curves each formed by the joining of two arcs of a circle tangent to each other, of which:
    a first arc of a circle of radius R1 centred on a first centre interposed between the geometric centre and a vertex of the major axis of the ellipse and arranged at the distance R1 from said vertex, where $$R1 = \frac{c^2 - a \times c + b \times c}{2 \times a},$$

in which $c=\sqrt{a^2+b^2}$, and a second arc of a circle of radius R2, centered on a second centre aligned with the minor axis of the ellipse and arranged at the distance R2 from a vertex of said minor axis, where $$R2 = \frac{a^3 + a^2c - a^2b + ab^2 - b^3 + cb^2}{2bc};$$

the heating grid is dome-shaped with a peak formed by the central support and a base formed by the peripheral frame; and each strand of each elongate heating element is shaped like an arc of a circle.

The disclosure also relates to a feeding member for an exhaust gas purification device of a vehicle, the feeding member comprising:

a power supply;

a shroud made of electrically conductive material, said shroud having an upstream face through which exhaust gases enter the feeding member and a downstream face through which exhaust gases exit the feeding member, the shroud being electrically connected to a first terminal of the power supply or to earth;

a heating member as described above, housed in the shroud, facing the downstream side, the heating member being mounted in said shroud so that the peripheral frame is in electrical contact with the shroud; and an electrode electrically connecting the central support to a second terminal of said power supply, said electrode extending through the shroud and being electrically insulated from said shroud.

According to a particular embodiment of the disclosure, the feeding member also has the following feature:

the heating grid has a dome shape, in which the peak is formed by the central support and the base is formed by the peripheral frame, and the heating member is mounted in the feeding member so that the convexity of the dome is directed upstream.

A further object of the disclosure is:

a device for purifying exhaust gases of an internal combustion engine comprising at least one exhaust gas purification member having an upstream face through which the exhaust gases enter the purification member and a downstream face through which the exhaust gases exit the purification member, the purification device further comprising at least one feeding member as defined above arranged so as to make the downstream face of the shroud of said feeding member substantially coincide with the upstream face of the purification member;

an internal combustion engine exhaust line comprising at least one such purification device; and a motor vehicle comprising such an exhaust line.

BRIEF DESCRIPTION OF THE DRAWINGS

Other characteristics and advantages of the disclosure will become apparent upon reading the following description, given only as an example and referencing the attached drawings, in which.

DETAILED DESCRIPTION

Figure 1:
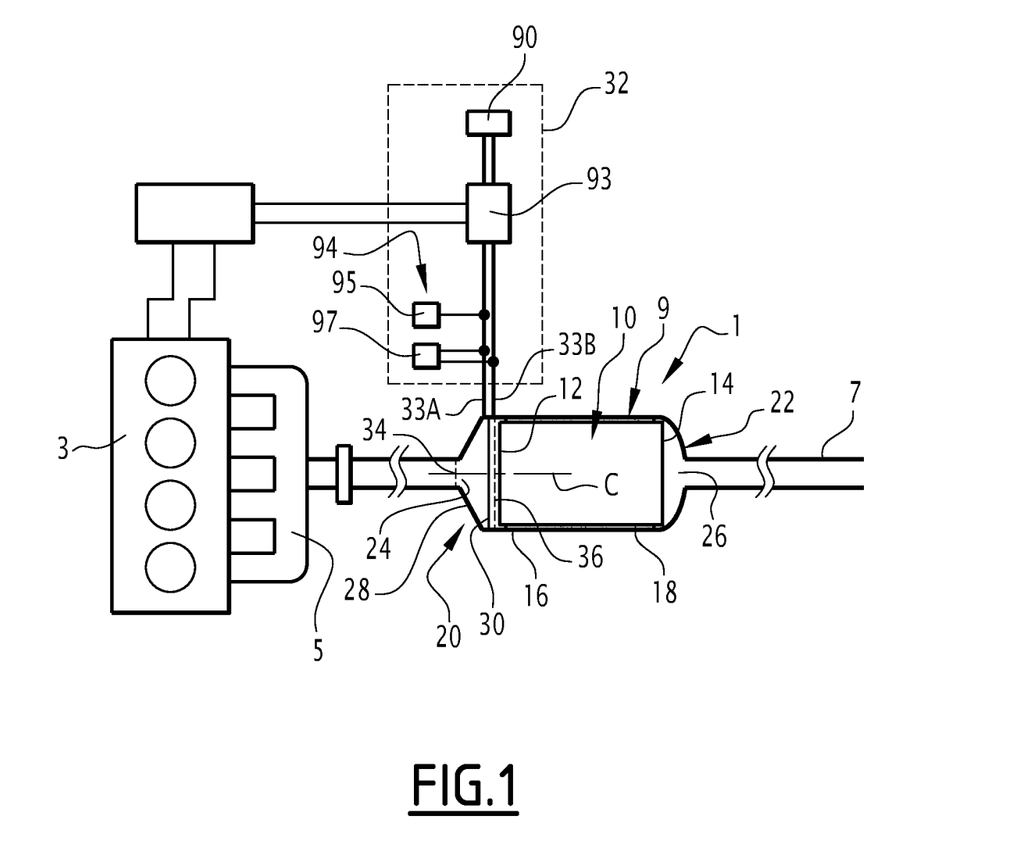
FIG. 1 is a schematic depiction of a vehicle comprising a motor vehicle exhaust line incorporating an exhaust gas purification device according to the disclosure.

The exhaust line 1 shown in FIG. 1 is intended to be installed in a vehicle, typically a vehicle with an internal combustion engine 3. This vehicle is typically a motor vehicle, for example a car or a truck.

As shown in FIG. 1, the exhaust line 1 comprises a manifold 5 which collects the exhaust gases from the combustion chambers of the engine 3, and a nozzle 7 which allows the exhaust gases to be released into the atmosphere. The exhaust line 1 further comprises an exhaust gas purification device 9, fluidly interposed between the manifold 5 and the nozzle 7, so that the exhaust gas reaching the nozzle 7 has been purified by said purification device 9.

This purification device 9 comprises at least one exhaust gas purification member 10 having an upstream face 12 through which the exhaust gas enters the purification member 10, and a downstream face 14 through which the exhaust gas exits the purification member 10.

In this description, upstream and downstream are understood to be relative to the normal flow direction of the exhaust gases in the exhaust line 1.

The purification unit 10 is, for example, an SCR catalyst, a three-way catalyst, an oxidation catalyst, an SCRF particulate filter, or a NOx trap. It has an axis of symmetry (not shown).

The purification device 9 further comprises a sleeve 16 within which the purification member 10 is placed, and a holding sheet 18 interposed between the purification member 10 and the sleeve 16.

The purification device 9 further comprises a supply member 20 for supplying the purification member 10 with exhaust gas from the manifold 5 and a collection member 22 for collecting the purified exhaust gas leaving the purification member 10 and directing it to the nozzle 7.

The feeding member 20 is typically in the form of an inlet cone or a mixer. It is fluidly interposed between the manifold 5 and the purification member 10, and comprises an exhaust gas inlet 24 fluidly connected to the manifold 5.

The collection member 22 is typically in the form of an outlet cone. It is fluidly interposed between the purification member 10 and the nozzle 7, and comprises an exhaust gas outlet 26 fluidly connected to the nozzle 7.

In particular, the feeding member 20 comprises a shroud 28 made of electrically conductive material, which delimits a passage for the exhaust gases, and a heating member 30 housed in the shroud 28. The feeding member 20 also comprises a power supply 32 with a first terminal 33A and a second terminal 33B for supplying electricity to the heating member 30.

The shroud 28 is electrically connected to the first terminal 33A of the power supply 32, typically with an electrical connection formed by a threaded rod welded to the shroud 28. Alternatively (not shown), the shroud 28 is electrically connected to earth with the same type of electrical connection.

As can be seen in FIG. 1, the shroud 28 has an upstream face 34 through which exhaust gases enter the feeding member 20, and a downstream face 36 through which exhaust gases exit the feeding member 20. The shroud 28 is adapted to guide gases entering from the upstream side 34 to the downstream side 36. The feeding member 20 is arranged relative to the purification member 10 so that the downstream side 36 of the shroud 28 substantially coincides with the upstream side 12 of the purification member 10.

The shroud 28 is a structural part adapted to withstand the mechanical stresses of an exhaust line without deforming.

The shroud 28 is attached to the sleeve 16, typically by welding, riveting, or screwing.

The downstream face 36 of the shroud 28 is centred on an axis C which is substantially coincident with the axis of symmetry of the purification member 10.

Figure 3:
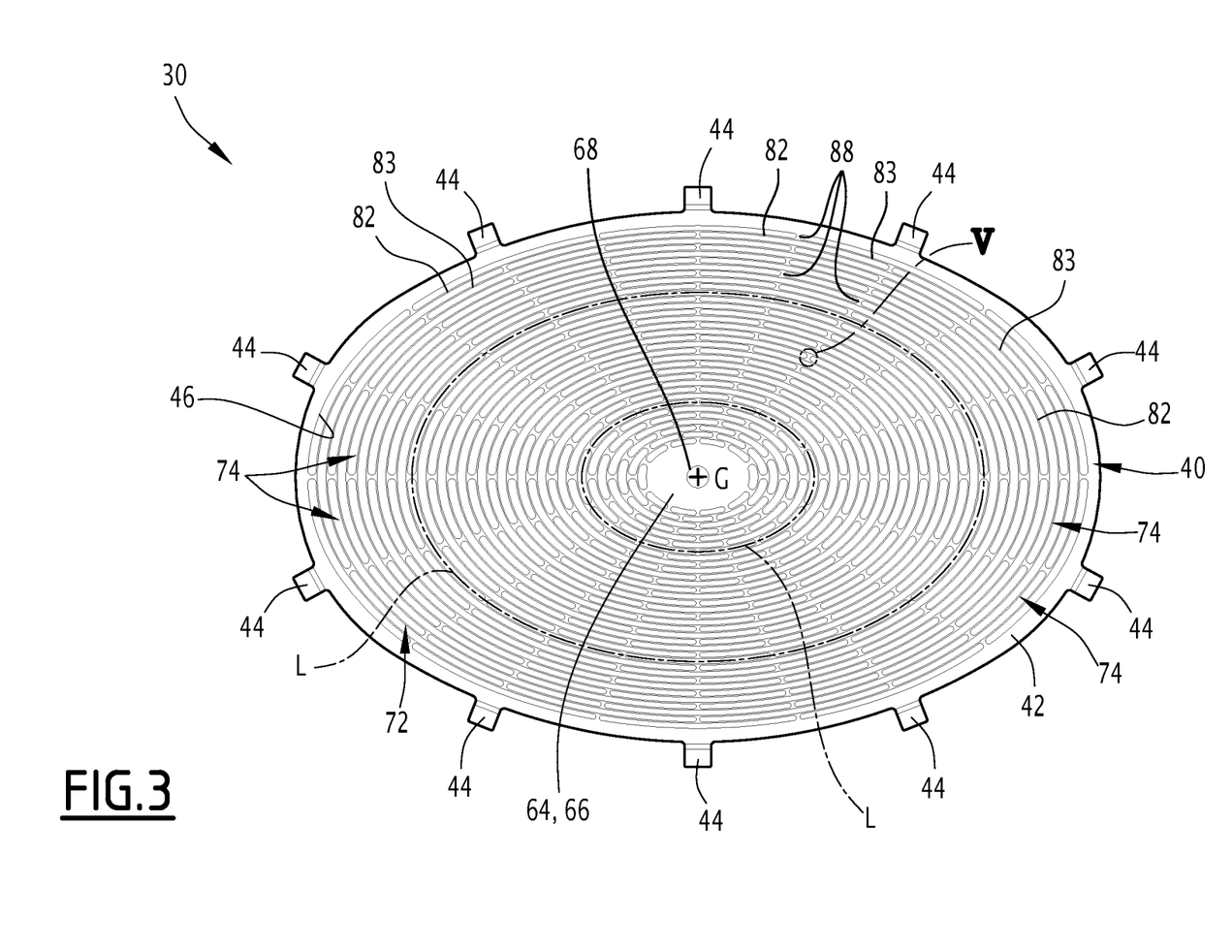
FIG. 3 is a front view of a heating element fitted to the purification device of FIG. 2, according to a first embodiment of the disclosure.
Figure 4:
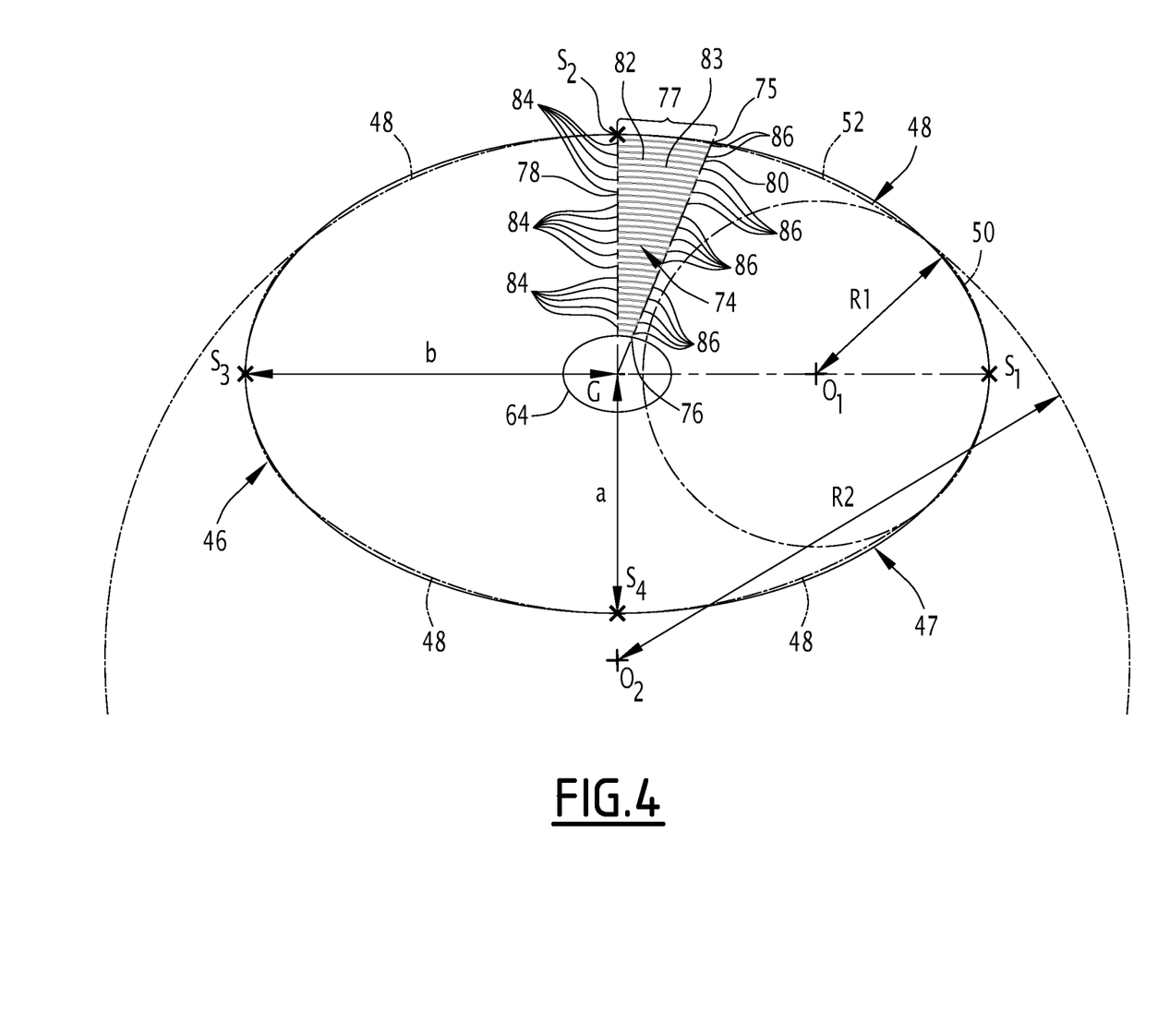
FIG. 4 is a simplified front view of the heating member of FIG. 3, said simplified view highlighting an elongate heating element comprising said heating member and the geometric relationships associated with that elongate heating element.
Figure 5:
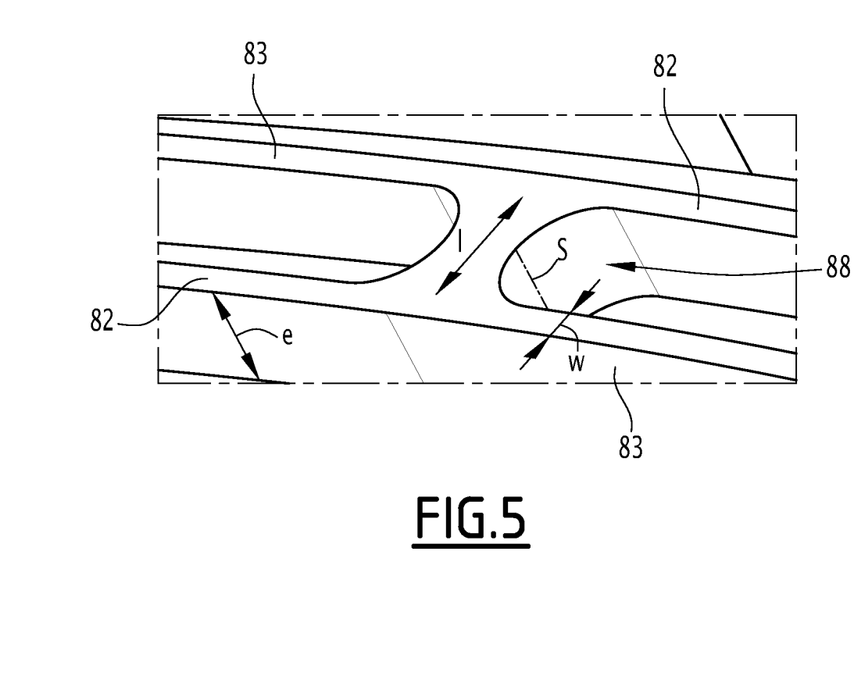
FIG. 5 is a detailed schematic view of a detail marked V of FIG. 3.

According to a first embodiment of the disclosure, illustrated in more detail in FIGS. 3 to 5, the cross-section of the downstream face 36 is non-circular and is in particular substantially elliptical. According to a second embodiment of the disclosure, illustrated in more detail in FIGS. 6 and 7, the cross-section of the downstream face 36 is circular.

Figure 2:
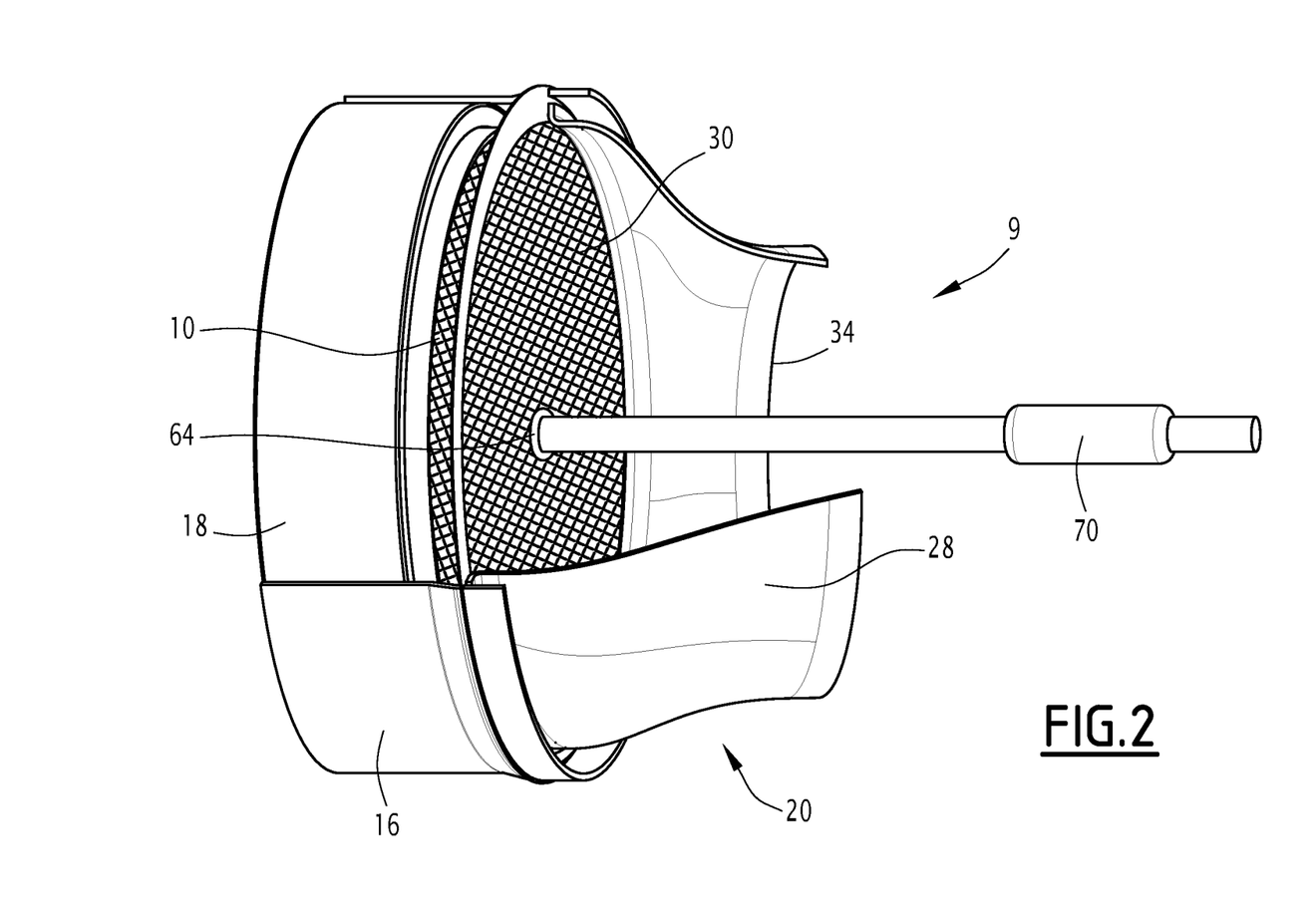
FIG. 2 is a perspective view of part of a purification device of the exhaust line of FIG. 1, the outer wall of which has been partially cut away so that the interior of the device is visible.

As can be seen in FIG. 2, the heating member 30 is housed in the shroud 28 opposite the downstream face 36, set back slightly towards the interior of the feeding member 20 with respect to that downstream face 36. "Set back slightly" means that the heating member 30 is at a distance of between 1 and 50 mm from the downstream face 36. The heating member 30 is thus placed opposite and at a distance from the upstream face 12 of the purification member 10.

Alternatively (not shown), the heating member 30 is housed in the shroud 28 opposite the upstream face 34, set back slightly towards the interior of the feeding member 20 with respect to that upstream face 34.

Preferably, the heating member 30 is substantially flat, i.e. it has an axial thickness of less than 10% of its radial diameter.

The heating member 30 is made of a conductive material. It is preferably formed of one piece.

The conductive material is, for example, selected from iron-chromium-aluminium (FeCrAl) and its alloys, nickel-chromium (NiCr) and its alloys, stainless steel, Inconel® or silicon carbide. For example, the material is Kanthal® A1, Nichrome® 80, Nichrome® 70, Nikrothal® 80 or Nikrothal® 70.

The heating member 30 is typically made by cutting a sheet of conductive material. This cutting is done for example by laser, by fine-blanking, by chemical cutting, or by any other methods that creates holes in the plate.

Alternatively, the heating member 30 is produced by additive manufacturing, in particular by three-dimensional printing.

The heating member 30 is self-supporting.

With reference to FIG. 3, the heating member 30 comprises a fastening ring 40. This fastening ring 40 comprises an electrically conductive peripheral frame 42 having an inner edge 46 with a geometric centre G, and a plurality of electrically conductive radial protrusions 44 distributed around the peripheral frame 42, each radial protrusion 44 protruding from the peripheral frame 42 in a direction away from the geometric centre G of the peripheral frame 42.

The peripheral frame 42 defines a plane (not shown) substantially orthogonal to the axis C.

In the first embodiment shown here, the inner edge 46 of the peripheral frame 42 is non-circular and is in particular oval. It is here substantially elliptical, i.e. it has substantially the shape of an ellipse 47 whose vertices $S_1$, $S_2$, $S_3$ and $S_4$ belong to the inner edge 46, this ellipse 47 being of geometric centre G and having a semi-major axis of length a and a semi-minor axis of length b, each point of the inner edge 46 being at a distance from the said ellipse 47 of less than 10% of the length of the radius of the ellipse 47 passing through that point.

With reference to FIG. 4, the inner edge 46 is more particularly constituted by the joining of four curves 48 each formed by the joining of two arcs of a circle 50, 52 tangent to one another, of which:

a first arc of a circle 50 of radius R1 and centred on a centre $O_1$ interposed between the geometric centre G and a vertex $S_1$ of the major axis of the ellipse 47 and arranged at a distance from said vertex $S_1$ equal to the radius R1, where $$R1 = \frac{c^2 - a \times c + b \times c}{2 \times a},$$

in which $c=\sqrt{a^2+b^2}$, and a second arc of a circle 52 of radius R2 and centred on a centre $O_2$ aligned with the minor axis of the ellipse 47 and arranged at a distance from a vertex $S_2$ of said minor axis equal to the radius R2, where $$R2 = \frac{a^3 + a^2c - a^2b + ab^2 - b^3 + cb^2}{2bc}.$$

The length P of the inner edge 46 is thus given by the following formula:

$$P = \pi(a+b) \cdot \left(1 + \frac{3h}{10 + \sqrt{4-3h}}\right),$$

in which $$h = \frac{(a-b)^2}{(a+b)^2}.$$

This specific shape of the inner edge 46 facilitates the design of the heating member 30 since, as will be detailed below, it can thus be composed essentially of elements that are arcs of a circle, which is a simple and perfectly mastered geometric shape.

Alternatively, the inner edge 46 is a perfect ellipse.

The geometric centre G is substantially aligned with the axis C, i.e. the geometric centre G is at a distance from the axis C of less than 10 mm, advantageously less than 5 mm.

Each radial protrusion 44 is advantageously integral with the peripheral frame 42. Each radial protrusion 44 typically comprises a tab formed of the same piece as the peripheral frame 42.

The fastening ring 40 is welded, brazed or press-fitted into the shroud 28 so that each radial protrusion 44 is in contact with the shroud 28. Thus, the fastening ring 40, and in particular its peripheral frame 42, is at approximately the same electrical potential as the shroud 28.

The heating member 30 also comprises a central support 64 arranged substantially at the geometric centre G of the inner edge 46 of the peripheral frame 42.

The central support 64 has a thickness substantially equal to the thickness of the peripheral frame 42.

Preferably, the central support 64 and the peripheral frame 42 lie substantially in the same plane, i.e. there is a plane passing through two opposite ends of the frame 42 and through the support 64.

The central support 64 has a largest dimension less than 20% of the largest dimension of the inner edge 46 of the peripheral frame 42.

In particular, the central support 64 comprises a washer 66 made of conductive material, centred on the geometric centre G.

The contour of this washer 66 is a homothety of centre G of the inner edge 46 of the peripheral frame 42. Thus, the contour of the washer 66 is, in this first embodiment, oval and has, in particular, substantially the shape of an ellipse whose minor and major axes are respectively aligned with the minor and major axes of the ellipse 47.

Here the washer 66 is solid, except for a through-hole 68 formed in its centre. Alternatively (not shown), the washer 66 contains cut-outs.

As shown in FIG. 2, the central support 64 is electrically connected to the second terminal 33B of the power supply 32 by an electrode 70 extending through the shroud 28 and electrically insulated from it. The central support 64 is in particular connected to said electrode 70 by screwing, welding, brazing or any other suitable method.

The electrode 70 is rigidly attached to the shroud 28.

Returning to FIG. 3, the heating member 30 further comprises a perforated heating grid 72, centred on the geometric centre G and extending from the central support 64 to the peripheral frame 42.

This heating grid 72 is self-supporting.

The heating grid 72 has a substantially constant, and preferably constant, thickness. Advantageously, the heating grid 72 has a thickness substantially equal to the thickness of the peripheral frame 42 and that of the central support 64.

The heating grid 72 is made of one material. It is made of a conductive material. In particular, it is integral with the peripheral frame 42 and the central support 64.

The heating grid 72 is formed of a plurality of elongate heating elements 74. Here, the number of such elongate heating elements 74 is a multiple of four.

As shown in FIG. 4, each elongate heating element 74 has a first end 75 and a second end 76 opposite one another. The first end 75 is connected to the peripheral frame 42, and the second end 76 is connected to the central support 64.

The first end 75 is thus electrically connected to the first terminal 33A of the power supply 32, and the second end 76 is electrically connected to the second terminal 33B of the power supply 32. Therefore, when the power supply 32 is active, there is an electrical potential difference between the first end 75 and the second end 76 of each elongate heating element 74. This electrical potential difference is a function of the potential difference between terminals 33A, 33B of the power supply 32.

Each elongate heating element 74 occupies a respective angular sector 77 about the geometric centre G. This angular sector 77 is defined between a first radius 78 and a second radius 80 each extending from the geometric centre G to the peripheral frame 42. Here, the first and second radii 78, 80 are chosen so that the angle from the first radius 78 to the second radius 80 is a negative angle.

The angular sectors 77 occupied by the elongate heating elements 74 are adjacent to each other. Thus, each angular sector 77 occupied by an elongate heating element 74 is interposed between first and second neighbouring angular sectors 77 each occupied by a respective elongate heating element 74, the first radius 78 of said angular sector 77 being conflated with the second radius 80 of the first neighbouring angular sector 77, and the second radius 80 of said angular sector 77 being conflated with the first radius 78 of the second neighbouring angular sector 77.

As shown in FIG. 4, at least one of these angular sectors 77 is such that its first radius 78 is constituted by a semi-minor axis or a semi-major axis of the ellipse 47. Advantageously, at least one other of these angular sectors 77 is such that its second radius 80 is constituted by a semi-major axis, respectively by a semi-minor axis, of said ellipse 47.

Each elongate heating element 74 is arranged in a zigzag manner within the angular sector 77 which it occupies so as to form a succession of strands 82, 83 connected to the central support 64, to the peripheral frame 42 and to each other by bends 84, 86.

Each strand 82, 83 extends from the first radius 78 to the second radius 80.

Advantageously, the strands 82, 83 of said elongate heating element 74 are evenly distributed between the central support 64 and the peripheral frame 42, such that each strand 82, 83 interposed between two other strands 82, 83 is equidistant from said two other strands 82, 83, and each end strand 82, 83 is equidistant from the nearest strand 82, 83 and from the central support 64 or peripheral frame 42.

The bends 84, 86 comprise first bends 84 aligned with each other along the first radius 78, and second bends 86 aligned with each other along the second radius 80. The first bends 84 are spaced apart from each other, and the second bends 86 are spaced apart from each other.

The first and second bends 84, 86 are arranged alternately with each other, from the central support 64 to the peripheral frame 42; in other words, for each pair of successive first bends 84, there is a second bend 86 which is at a distance from the geometric centre G greater than the distance from the geometric centre G of one of the bends 84 of the pair and less than the distance from the geometric centre G of the other bend 84 of the pair, and vice versa.

The strands 82, 83 comprise first strands 82 and second strands 83. Each first strand 82 is connected by a first bend 84 to a strand 83 closer to the geometric centre G, or to the central support 64, and by a second bend 86 to a strand 83 further from the geometric centre G, or to the peripheral frame 42. Each second strand 83 is connected by a second bend 86 to a strand 82 closer to the geometric centre G, or to the central support 64, and by a first bend 84 to a strand 82 further from the geometric centre G, or to the peripheral frame 42.

The first and second strands 82, 83 are arranged alternately with each other, from the central support 64 to the peripheral frame 42; in other words, for each pair of successive first strands 82, there is a second strand 83 which is interposed between said first strands 82, and vice versa.

Each elongate heating element 74 is connected by said bends 84, 86, and exclusively by said bends 84, 86, to the elongate heating elements 74 occupying the neighbouring angular sectors 77. Thus, for each pair of neighbouring elongate heating elements 74, each first bend 84 of one such elongate element 74 is in contact with a respective second bend 86 of the other elongate element 74, said first and second bends 84, 86 being at the same electrical potential and together forming a node 88 (FIG. 3).

As seen in FIG. 3, at the junction between elongate heating elements 74 occupying two neighbouring angular sectors 77, each strand 82, 83 of each elongate heating element 74 is tangent to a corresponding strand 82, 83 of the other elongate heating element 74. Thus, the junction between these elongate heating elements 74 is free of angular points, which allows a better distribution of stresses within the heating grid 72 and reinforces the thermomechanical resistance of the heating grid 72.

For each strand 82, 83 of an elongate heating element 74, that strand 82, 83 forms, together with the corresponding strands 82, 83 of the other elongate heating elements 74, a closed contour substantially centred on the geometric centre G. This closed contour is in particular substantially a homothety of centre G of the inner edge 46 of the peripheral frame 42; here, therefore, it is a substantially elliptical shape.

The strands 82, 83 thus form concentric rings centred on the geometric centre G and connected to the central support 64, the peripheral frame 42 and to each other by staggered nodes 88.

All nodes 88 are arranged on a plurality of closed-contour isopotential lines L. Some of these lines are shown in FIG. 3. The isopotential lines L are approximately centred on the geometric centre G.

No isopotential line L crosses any of the concentric rings formed by the strands 82, 83.

Here, the isopotential lines L are homotheties of centre G of the inner edge 46 of the peripheral frame 42.

All nodes 88 at the same electrical potential are placed on the same isopotential line L. It is possible that some of the isopotential lines L are conflated.

Here, the isopotential lines L all have an increasing average diameter as the electric potential decreases.

To enable such an arrangement, all nodes 88 located on the same isopotential line L are located along said elongate heating elements 74 at an equal electrical distance from the respective first ends 75 of the elongate heating elements 74.

These nodes 88 are also typically located at the same electrical distance from the respective second ends 76 of said elongate heating elements 74.

The term "electrical distance" between two points is understood here, and in the following, to mean the value of the electrical resistance between these two points. Thus, it is equivalent to say that two pairs of points have their respective points at the same electrical distance from each other and to say that the electrical resistance between the points of the first pair is equal to the electrical resistance between the points of the second pair.

To this end, each angular sector 77 of the heating grid 72 embraces a portion of the inner edge 46 of the peripheral frame 42 equal in length to the length of the inner edge 46 of the peripheral frame 42 embraced by each other angular sector 77.

Thus, for each quarter of the ellipse 47, each radius 78, 80 forming the separation between two neighbouring angular sectors 77 included in this quarter of ellipse is such that:

when $$n \times \frac{P}{N} \leq R2 \times \cos^{-1}\left(\frac{a}{c}\right),$$

where n is the number of angular sectors 77 interposed between the minor axis of the ellipse 47 and said radius 78, 80, and N is the total number of angular sectors 77, the radius 78, 80 forms with the minor axis of the ellipse 47 an angle substantially equal to $$\tan^{-1}\left(\frac{R2 \times \sin\left(\frac{n \times P}{N \times R_2}\right)}{b + R2 \times \left(\cos\left(\frac{n \times P}{N \times R_2}\right) - 1\right)}\right),$$

and
when $$n \times \frac{P}{N} > R2 \times \cos^{-1}\left(\frac{a}{c}\right),$$

the radius 78, 80 forms an angle with the major axis of the ellipse 47 substantially equal to $$\tan^{-1}\left(\frac{R1 \times \sin\left(\frac{q \times P}{N \times R_1}\right)}{a + R1 \times \left(\cos\left(\frac{q \times P}{N \times R_1}\right) - 1\right)}\right),$$

where q is the number of angular sectors 77 interposed between the major axis of the ellipse 47 and said radius 78, 80.

Further, for each elongate heating element 74, each strand 82, 83 is substantially a homothety of centre G and ratio h/H of the portion of the inner edge 46 of the peripheral frame 42 embraced by the angular sector 77 occupied by the elongate heating element 74, where h is the distance from the geometric centre G to the middle of the strand 82, 83, and H is the distance from the geometric centre G to the middle of the portion of the peripheral frame 42 embraced by the angular sector 77, the corresponding strands 82, 83 of different elongate heating elements 74 having substantially equal h/H ratios.

In particular, for each elongate heating element 74 occupying an angular sector 77 which embraces a portion of the inner edge 46 of the peripheral frame 42 formed by the first arc 50, each strand 82, 83 of said elongate heating element 74 is constituted by an exact homothety of said portion of the inner edge 46. Each strand 82, 83 is thus constituted by an arc of a circle of radius $$R1 \times \left(\frac{d}{b} + \frac{i+1}{k+1} \times \left(1 - \frac{d}{b}\right)\right)$$

and centred at a point such that the distance of said point from the geometric centre G is equal to $$(a - R1) \times \frac{d}{b} + \frac{i+1}{k+1} \times (a - R1) \times \left(1 - \frac{d}{b}\right),$$

where: d is the semi-minor axis of the central support 64, i is the number of strands 82, 83 interposed between said strand 82, 83 and the central support 64, and k is the total number of strands 82, 83 composing the elongate heating element 74.

Likewise, for each elongate heating element 74 occupying an angular sector 77 which embraces a portion of the inner edge 46 of the peripheral frame 42 formed by the second arc 52, each strand 82, 83 of said elongate heating element 74 is constituted by an exact homothety of said portion of the inner edge 46. Each strand 82, 83 is thus constituted by an arc of a circle of radius $$R2 \times \left(\frac{d}{b} + \frac{i+1}{k+1} \times \left(1 - \frac{d}{b}\right)\right)$$

and centred at a point such that the distance of said point from the geometric centre G is equal to $$(R2 - b) \times \frac{d}{b} + \frac{i+1}{k+1} \times (R2 - b) \times \left(1 - \frac{d}{b}\right).$$

Furthermore, for each elongate heating element 74 occupying an angular sector 77 which embraces a portion of the inner edge 46 of the peripheral frame 42 straddling the part formed by the first arc 50 and that formed by the second arc 52, each strand 82, 83 of said elongate heating element 74 is constituted by an arc tangent to the strands 82, 83 of the elongate heating elements 74 occupying the neighbouring angular sectors 77.

Each strand 82, 83 thus has a length substantially equal to the length of each corresponding strand 82, 83 of each other elongate heating element 74. In addition, each strand 82, 83 is thus shaped like an arc of a circle, which ensures that each strand 82, 83, and thus the heating grid 72, is mechanically secure.

Furthermore, each strand 82, 83 has a cross-sectional area, taken perpendicular to its length, substantially equal to the cross-sectional area of each corresponding strand 82, 83 of each other elongate heating element 74.

Thus, each strand 82, 83 has an electrical resistance substantially equal to the electrical resistance of each corresponding strand 82, 83 of each other elongate heating element 74.

Finally, with reference to FIG. 5, the ratio of the length 1 of each node 88, measured radially between the strands 82, 83 of a single elongate heating element 74 which it connects, to the minimum cross-sectional area S of said node 88, measured perpendicular to the length 1, is substantially equal to the ratio of the length 1 to the minimum cross-sectional area S of each other node 88 arranged on the same isopotential line L as the node 88.

Thus, each node 88 arranged on an isopotential line L has an electrical resistance substantially equal to the electrical resistance of each other node 88 arranged on the same isopotential line L. Accordingly, for each pair of strands 82, 83 of each elongate heating element 74, the electrical resistance between these strands 82, 83 is substantially equal to the electrical resistance between the corresponding strands 82, 83 of each other elongate heating element 74.

As a result, each elongate heating element 74 has an electrical resistance between its first and second ends 75, 76 substantially equal to the electrical resistance of each other elongate heating element 74. Furthermore, all nodes 88 located on the same isopotential line L are located along said elongate heating elements 74 at the same first electrical distance from the respective first ends 75 of the elongate heating elements 74 and at the same second electrical distance from the respective second ends 76 of said elongate heating elements 74.

Thus, the heating grid 72 does not have a preferential path for the flow of electric current between the central support 64 and the peripheral frame 42. The electrical current supplied by the power supply 32 can therefore be distributed evenly throughout the heating grid 72, thereby causing the grid to heat up evenly.

Still referring to FIG. 5, each strand 82, 83 of each elongate heating element 74 has a thickness e, taken parallel to the direction of flow of the exhaust gas through the heating grid 72, i.e. perpendicular to the plane of the heating member 30, and a width w taken perpendicularly to the direction of flow of the exhaust gas through the heating grid 72, i.e. in the plane of the heating member 30, and perpendicularly to the direction of the largest dimension of said strand 82, 83, such that the thickness e is greater than the width w, the ratio of the thickness e to the width w advantageously being greater than 1.5 and preferably greater than 2.0. Thus, the cross-section of each strand 82, 83, perpendicular to the direction of greatest dimension of said strand 82, 83, has a general rectangular or oval shape, or a polygonal shape intermediate between said rectangular and oval shapes, for example an elongate hexagonal shape.

This minimises the surface area of the heating grid 72 that is exposed to the exhaust gas pressure, thereby reducing the stress on the heating grid 72. At the same time, the additional material thickness downstream of the side of the heating grid 72 that is subjected to exhaust gas pressure increases the mechanical strength of the heating grid 72 against this pressure. These two effects together significantly increase the durability of the heating grid 72.

Preferably, the ratio of thickness e to width w is less than 10, for example less than 5, so as to allow easy industrial manufacture of the heating grid 72.

The heating member 30 is advantageously obtained by using the following design method, this design method typically being computer-implemented.

First, an ellipse is determined which is centred on the centre of the downstream face 36 of the shroud 28, and of a size adapted to leave sufficient space between the said ellipse and the wall of the shroud 28 to accommodate the peripheral frame 42 and the protrusions 44. This ellipse constitutes ellipse 47.

One of the curves 48 making up the inner edge 46 is then drawn. For this purpose, arcs 50 and 52 are drawn and joined to form curve 48.

A homothety of each arc of a circle 50, 52, with centre G and ratio $$\frac{d}{b}$$

is then drawn, this ratio being fixed at a predetermined value. The curve formed by the joining of these homotheties will form a portion of the peripheral edge of the central support 64.

The number N of elongate heating elements 74 to make up the heating grid 72 is then determined. For this purpose, the nominal operating temperature of the heating member 30 and the nominal total radiant heat output, and possibly the nominal total convective heat output of the heating member 30, are taken into account. These parameters make it possible to determine, with the help of the laws of radiation/convection and Joule effect, a theoretical total length $L_T$ of the elongate heating elements 74 as a function of the perimeter (equal to the sum $2 \times e + 2 \times w$) and the cross-section (equal to the product e×w) of said elongate heating elements 74. The electrical resistance R of this theoretical total length $L_T$, given by the formula $$R = \rho \times \frac{L_T}{S},$$

where ρ is the resistivity of the material, is then reduced to a target electrical resistance Rt determined from the desired nominal voltage for the power supply 32, and the ratio R/Rt is rounded or optimised to the nearest even number, for example by dichotomy with the target temperature as the parameter, this even number forming the number N of elongate heating elements 74.

An angular sector 77, centred on the geometric centre G, adjacent to the minor axis of the ellipse 47 and forming an angle $$\tan^{-1}\left(\frac{R2 \times \sin\left(\frac{P}{N \times R2}\right)}{b + R2 \times \left(\cos\left(\frac{P}{N \times R2}\right) - 1\right)}\right),$$

is then selected, and the number k of strands 82, 83 which are to make up the elongate heating element 74 occupying this angular sector 77 is determined as if the elongate heating element 74 occupied an angular sector, of angle $$\tan^{-1}\left(\frac{R2 \times \sin\left(\frac{P}{N \times R2}\right)}{b + R2 \times \left(\cos\left(\frac{P}{N \times R2}\right) - 1\right)}\right),$$

of a round grid of radius equal to the semi-minor axis b of the ellipse 47 and whose centre would be occupied by a central support of radius equal to d. To this end, the length of the elongate heating element 74 is calculated for a number i of strands radially equidistant between said central support and the periphery of the round grid, each strand being constituted by an arc of a circle centred at $O_2$, and the number i is iterated on until a length as close as possible to the theoretical total length $L_T$ is obtained. The final value of the number i then constitutes the number k.

The remaining angular sectors 77 are then placed so that each radius 78, 80 forming the separation between two neighbouring angular sectors 77 is such that:
when $$n \times \frac{P}{N} \leq R2 \times \cos^{-1}\left(\frac{a}{c}\right),$$

the radius 78, 80 forms an angle with the minor axis of the ellipse 47 substantially equal to $$\tan^{-1}\left(\frac{R2 \times \sin\left(\frac{n \times P}{N \times R2}\right)}{b + R2 \times \left(\cos\left(\frac{n \times P}{N \times R2}\right) - 1\right)}\right),$$

and
when $$n \times \frac{P}{N} > R2 \times \cos^{-1}\left(\frac{a}{c}\right),$$

the radius 78, 80 forms an angle with the major axis of the ellipse 47 substantially equal to $$\tan^{-1}\left(\frac{R1 \times \sin\left(\frac{q \times P}{N \times R1}\right)}{a + R1 \times \left(\cos\left(\frac{q \times P}{N \times R1}\right) - 1\right)}\right)$$

Then, for each angular sector 77 which embraces a portion of the curve 48 formed by the first arc of a circle 50, a succession of arcs of a circle of radius $$R1 \times \left(\frac{d}{b} + \frac{i}{k+1} \times \left(1 - \frac{d}{b}\right)\right)$$

is drawn, each centred at a respective point such that the distance of the said point from the geometric centre G is equal to $$(a - R1) \times \frac{d}{b} + \frac{i}{k+1} \times (a - R1) \times \left(1 - \frac{d}{b}\right),$$

with i being an integer ranging from 1 to k. These arcs constitute the strands 82, 83 of the elongate heating element 74 occupying this angular sector 77.

Likewise, for each angular sector 77 which embraces a portion of the curve 48 formed by the second arc of a circle 52, a succession of arcs of a circle of radius $$R2 \times \left(\frac{d}{b} + \frac{i}{k+1} \times \left(1 - \frac{d}{b}\right)\right)$$

is drawn, each centred at a respective point such that the distance of the said point from the geometric centre G is equal to $$(R2 - b) \times \frac{d}{b} + \frac{i}{k+1} \times (R2 - b) \times \left(1 - \frac{d}{b}\right),$$

with i being an integer ranging from 1 to k. These arcs constitute the strands 82, 83 of the elongate heating element 74 occupying this angular sector 77.

Then, with regard to the angular sector 77 which embraces the portion of the curve 48 straddling the part formed by the first arc of a circle 50 and the one formed by the second arc of a circle 52, a succession of arcs of a circle is drawn, each tangent to a strand 82, 83 of each elongate heating element 74 occupying a neighbouring angular sector 77. These arcs constitute the strands 82, 83 of the elongate heating element 74 occupying this angular sector 77.

The strands 82, 83 are thus drawn so that, for each pair of strands 82, 83 tangent to each other, said strands 82, 83 have substantially the same cross-section. This cross-section is determined in particular by taking into account the characteristics of the power supply 32, for example by taking into account the potential difference applied between the first and second ends 76, 78 of the elongate heating element 74.

The nodes 88 are then placed along the radii 78, 80 forming the separation between the angular sectors 77 so that said nodes 88 are spaced apart from each other while providing electrical and mechanical continuity from the central support 64 to the curve 48. For this purpose, the nodes 88 are staggered, i.e. so that for each pair of adjacent radii 78, 80, the nodes 88 are arranged alternately on one and the other radius 78, 80, as their distance from the geometric centre G increases.

The nodes 88 are further designed such that, for each node 88 arranged at a first distance d1 from the geometric centre G and at a second distance d2 from the curve 48, the ratio of the length l to the minimum cross-sectional area S of said node 88 is substantially equal to the ratio of the length l to the minimum cross-sectional area S of each other node 88 arranged at distances from the geometric centre G and from the curve 48 such that the ratio of these distances is substantially equal to d1/d2. For example, the nodes 88 are designed so that the ratio between the length l and the minimum cross-sectional area S of the nodes 88 is substantially equal for all nodes 88.

A pattern is thus obtained, the symmetries of which are then drawn with respect to the major axis, the minor axis and the centre of the ellipse 47, so as to obtain the complete heating grid 72.

The design is finally completed with the fastening ring 40 and the central support 64, so that the complete heating member 30 is obtained.

Advantageously, the design of the heating member 30 will then be used to control a PLC for producing the heating member 30.

Returning to FIG. 1, the power supply 32 comprises a source 90 of electrical energy, such as the vehicle's electric battery, or a supercapacitor device.

The electrical power source 90 is typically adapted to provide direct or chopped current at a vehicle-dependent voltage (e.g. 12, 48 or 400 volts).

The power supply 32 also includes a controller 93 arranged to control the supply of electrical power to the heating member 30.

The controller 93 comprises, for example, an information processing unit comprising a processor and a memory associated with the processor. Alternatively, the controller 93 is implemented as programmable logic components, such as Field-Programmable Gate Arrays (FPGAs), or as dedicated integrated circuits, such as Application-Specific Integrated Circuits (ASICs).

In particular, the controller 93 is configured to select the voltage and current supplied by the power supply 32 to the heating member 30, so as to maintain the heating power and/or electrical power consumption within a specified range.

Typically, the controller 93 controls the heating by Pulse Width Modulation (PWM).

The power supply 32 further comprises a member 94 for acquiring the amperage of the electric current supplying the elongate heating elements 74 and the electric voltage across the elongate heating elements 74.

This member 94 is of any suitable type.

For example, the member 94 is an acquisition device that comprises a sensor 95 for measuring electric current and a sensor 97 for measuring electric voltage. Alternatively, the electric current and the electric voltage are obtained by calculation, from information retrieved from the controller 93.

Advantageously, the controller 93 is configured to control the temperature of the elongate heating elements 74, monitor the proper operation of the elongate heating elements 74, determine the temperature of the exhaust gases when the heating member 30 is no longer used to heat the purifier 10, and determine the flow rate of exhaust gases through the purifier 10 once the heating member 30 is no longer used to heat the purifier 10. For this purpose, the controller 93 is for example configured to implement the control programs described in FR 3 065 027 A1.

Figure 6:
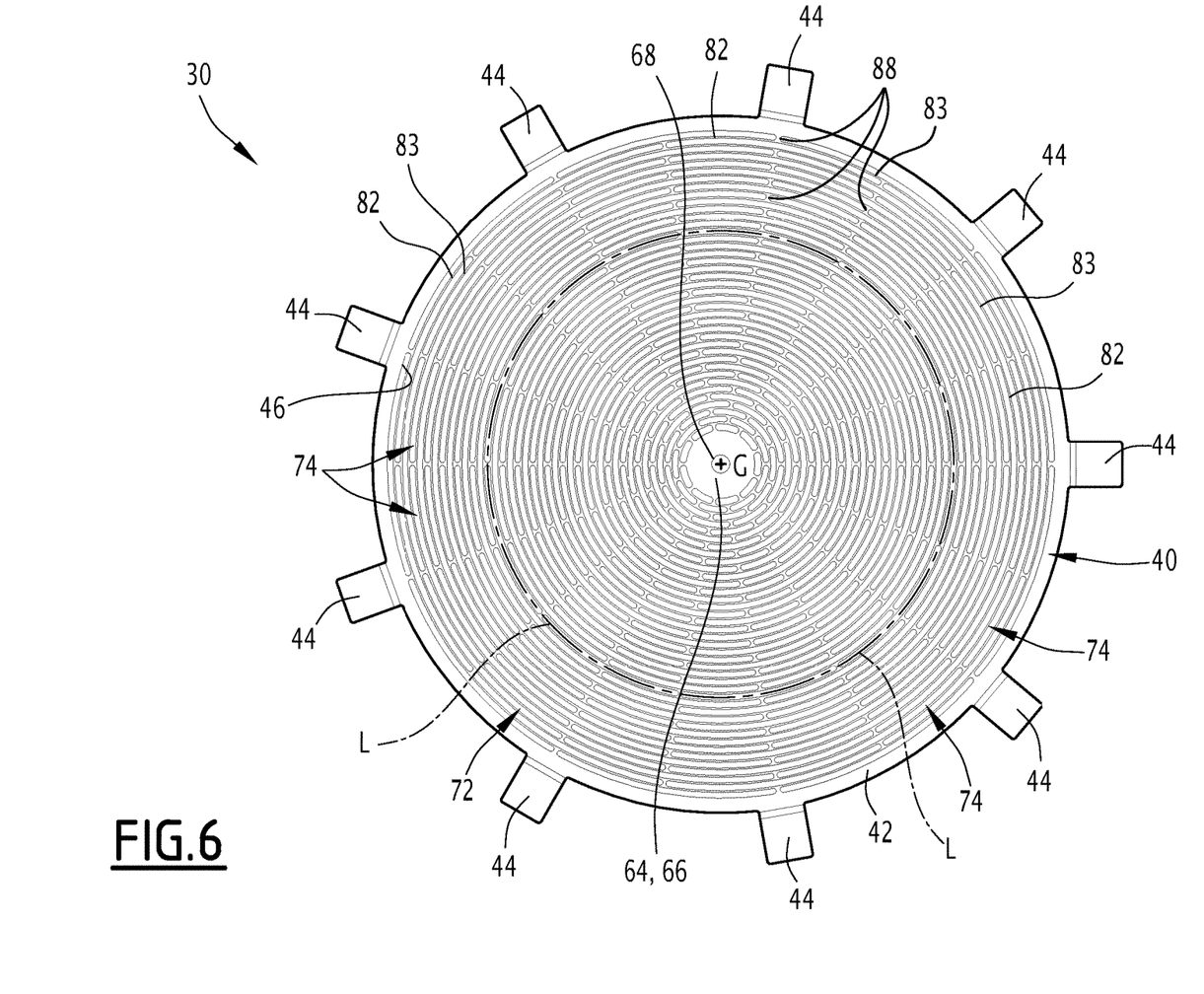
FIG. 6 is a front view of a heating element fitted to the purification device of FIG. 2, according to a first variant of a second embodiment of the disclosure.
Figure 7:
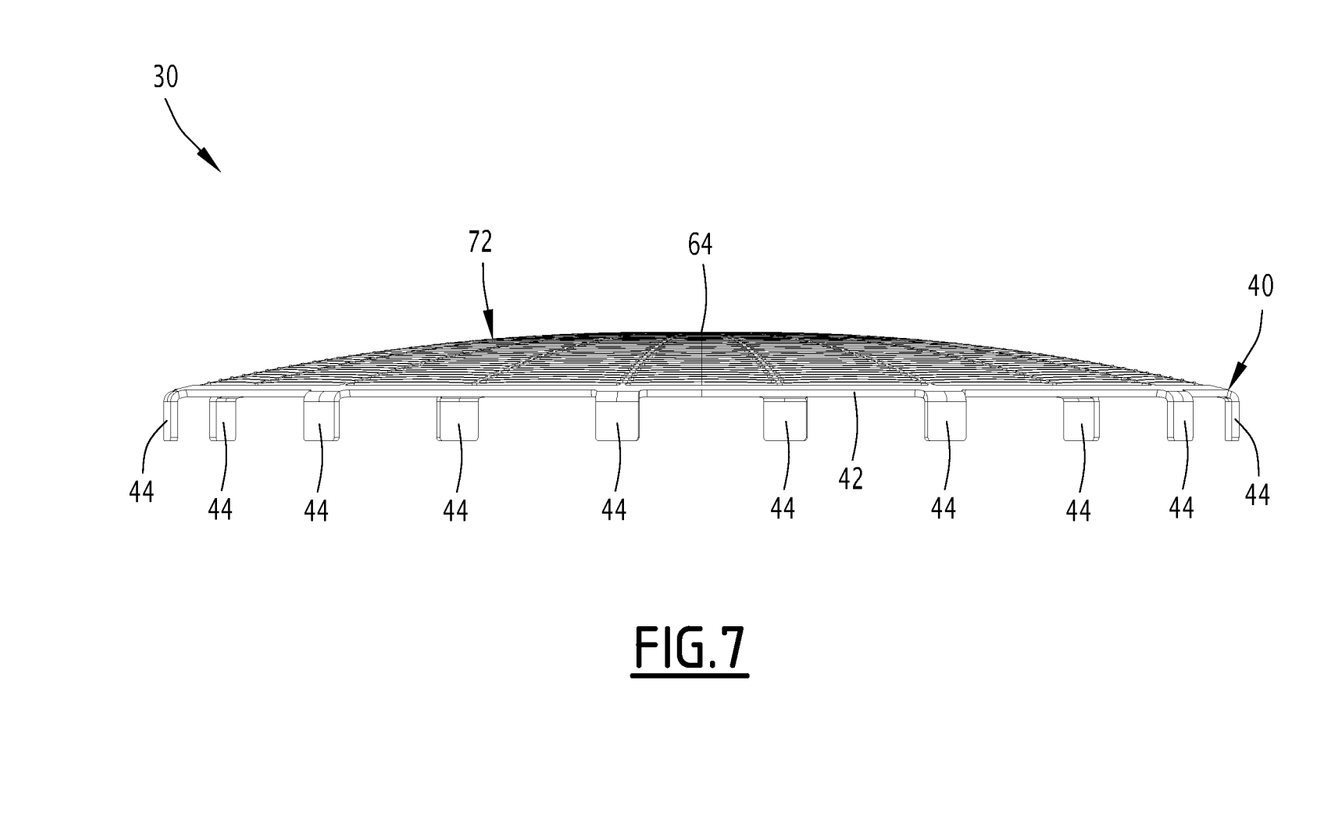
FIG. 7 is a side view of a heating element fitted to the purification device of FIG. 2, according to a second variant of the second embodiment of the disclosure.

With reference to FIGS. 6 and 7, the heating member 30 according to the second embodiment of the disclosure differs from the heating member 30 of the first embodiment only in that the inner edge 46 of the peripheral frame 42 is not oval but circular.

Consequently, the contour of the washer 66, the closed contours formed by the corresponding strands 82, 83 of the various elongate heating elements 74, and the isopotential lines L, which are homotheties of centre G of this internal edge 46, are all constituted by circles centred on the geometric centre G. Moreover, each strand 82, 83 of each elongate heating element 74 is constituted by an arc of a circle centred on the geometric centre G.

Furthermore, the heating member 30 according to the second embodiment of the disclosure thus shares with the heating member 30 of the first embodiment in particular the characteristics relating to:

the absence of an angular point at the junction between the strands 82, 83 of the various elongate heating elements 74, the ratio of the length l to the minimum cross-sectional area S of the nodes 88, and the ratio between the thickness e and the width w of the strands 82, 83.

The heating member 30 in FIG. 7 differs from those shown in the previous Figures in that it is not flat. In particular, the central support 64 is axially offset from the plane of the peripheral frame 42 so that the central support 64 and the peripheral frame 42 are not in the same plane.

The heating grid 72 is then shaped like a dome, the peak of which is formed by the central support 64 and the base by the peripheral frame 42. The heating member 30 is mounted in the feeding member 20 in such a way that the convexity of this dome is directed upstream, i.e. so that the central support 64 is arranged upstream of the peripheral frame 42 in relation to the direction of flow of the exhaust gases.

This configuration gives the heating grid 72 better resistance to the exhaust gas flows, since the forces applied by these flows on the heating grid are thus redistributed towards the peripheral frame 42, and through this intermediary towards the shroud 28. It also makes it possible to absorb some of the thermal expansion caused by the rise in temperature of the heating grid 72 by allowing axial deformation of the heating grid 72; thus, the radial deformation is less significant, which reduces the risks of contact between the wires 82, 83 and thus the risks of short-circuit.

A further difference in the heating member shown in FIG. 7 is that the radial protrusions 44 are not in the plane of the peripheral frame 42 but project axially away from the central support 64.

Thanks to the disclosure described above, it is thus possible to obtain a heating member 30 with good mechanical strength, suitable for any type of purification device, including purification devices with an oval cross-section, and allowing relative heating homogeneity in conduits with such cross-sections. In addition, as the current can be distributed evenly within the heating member 30, this avoids the occurrence of hot spots which would result in local weakening of the heating member 30, to the point of potentially breaking.

In addition, the heating member 30 can be easily computer-designed using predetermined parameters, making it a low-cost component.

Finally, the heating member 30 can be easily handled, in particular transported without the risk of damage, and can be easily mounted on an existing exhaust gas purification device without impacting the form factor of the exhaust line.

Although various embodiments have been disclosed, a worker of ordinary skill in this art would recognize that certain modifications would come within the scope of this disclosure. For that reason, the following claims should be studied to determine the true scope and content of this disclosure.

The invention claimed is:

1. A heating member for a vehicle exhaust gas purification device, adapted to be arranged opposite and at a distance from an upstream or downstream face of the vehicle exhaust gas purification device, wherein said heating member comprises:
   an electrically conductive peripheral frame having an inner edge with a geometric centre, a central support arranged substantially at the geometric centre, and a perforated heating grid, centered on the geometric centre and extending from the central support to the electrically conductive peripheral frame, said perforated heating grid being formed of a plurality of elongate heating elements each having first and second ends opposite one another, the first end being linked to the electrically conductive peripheral frame and the second end being linked to the central support, each elongate heating element occupying a respective angular sector of the perforated heating grid and being arranged in zigzag manner within that angular sector so as to form a succession of strands connected by nodes and being linked by said nodes to the plurality of elongate heating elements occupying neighbouring angular sectors, and wherein the strands form concentric rings centered on the geometric center.

2. The heating member according to claim 1, wherein each strand has a thickness, taken parallel to a direction of flow of an exhaust gas stream through the perforated heating grid, and a width, taken perpendicular to the direction of flow of the exhaust gas stream through the perforated heating grid and perpendicular to a direction of greatest dimension of said strand, the thickness being greater than the width.

3. The heating member according to claim 2, wherein a ratio of the thickness to the width is greater than 1.5 and preferably greater than 2.0.

4. The heating member according to claim 1, wherein each strand of an elongate heating element occupying a given angular sector is tangent to a corresponding strand of each of the plurality of elongate heating elements occupying neighbouring angular sectors.

5. The heating member according to claim 1, wherein the nodes are arranged on a plurality of closed-contour isopotential lines and, for each node arranged on an isopotential line, a ratio of a length of said node measured between the strands the node connects, to a cross-sectional area of said node, measured perpendicular to the length, is substantially equal to the ratio of the length to the cross-sectional area of each other node arranged on the same isopotential line.

6. The heating member according to claim 1, wherein each angular sector of the perforated heating grid embraces a portion of the inner edge of the electrically conductive peripheral frame equal in length to a length of the inner edge embraced by each other angular sector.

7. The heating member according to claim 1, wherein the inner edge of the electrically conductive peripheral frame is oval.

8. The heating member according to claim 7, in which the inner edge of the electrically conductive peripheral frame has substantially a shape of an ellipse centred on the geometric centre having a semi-major axis of length and a semi-minor axis of length, said inner edge being constituted by a joining of four curves each formed by a joining of two arcs of a circle tangent to each other, of which:
   a first arc of a circle of radius R1 and centred on a first centre interposed between the geometric centre and a vertex of the major axis of the ellipse and arranged at a distance R1 from said vertex, where $$R1 = \frac{c^2 - a \times c + b \times c}{2 \times a},$$

in which $c=\sqrt{a^2+b^2}$, and
   a second arc of a circle of radius R2, centred on a second centre aligned with the minor axis of the ellipse and arranged at the distance R2 from a vertex of said minor axis, where $$R2 = \frac{a^3 + a^2c - a^2b + ab^2 - b^3 + cb^2}{2bc}.$$

9. The heating member according to claim 1, wherein the perforated heating grid is dome-shaped with a top formed by the central support and a base by the electrically conductive peripheral frame.

10. The heating member according to claim 1, wherein the inner edge of the electrically conductive peripheral frame is non-circular.

11. The heating member according to claim 9, wherein the perforated heating grid is configured such that a convexity of the perforated heating grid that is dome-shaped is directed upstream so that the central support is arranged upstream of the electrically conductive peripheral frame in relation to a direction of flow of exhaust gases.

12. The heating member according to claim 1, wherein the concentric rings are connected to the central support, the electrically conductive peripheral frame, and to each other by nodes that are staggered nodes.

13. The heating member according to claim 12, wherein all nodes are arranged on a plurality of closed-contour isopotential lines that are centered on the geometric center.

14. The heating member according to claim 12, wherein each concentric ring surrounds the central support, and wherein each concentric ring surrounds and/or is surrounded by an adjacent concentric ring.

15. A feeding member for an exhaust gas purification device of a vehicle, the feeding member comprising:
   a power supply;
   a shroud of electrically conductive material, said shroud having an upstream face through which exhaust gases enter the feeding member and a downstream face through which the exhaust gases exit the feeding member, the shroud being electrically connected to a first terminal of the power supply or to earth;
   the heating member according to claim 1, housed in the shroud, opposite the downstream face, the heating member being mounted in said shroud so that the electrically conductive peripheral frame is in electrical contact with the shroud; and
   an electrode electrically connecting the central support to a second terminal of said power supply, said electrode extending through the shroud and being electrically insulated from said shroud.

16. The feeding member according to claim 15, wherein the perforated heating grid of the heating member is dome-shaped with a top formed by the central support and a base by the electrically conductive peripheral frame, and wherein the heating member is mounted in the feeding member so that convexity of a dome shape of the top faces upstream.

17. An internal combustion engine exhaust line comprising at least one purification device according to claim 1.

18. A motor vehicle comprising the internal combustion engine exhaust line as claimed in claim 13.

19. A device for purifying exhaust gases of an internal combustion engine comprising:
  at least one exhaust gas purification member having an upstream face through which the exhaust gases enter the at least one exhaust gas purification member and a downstream face through which the exhaust gases exit the at least one exhaust gas purification member, the device further comprising at least one feeding member according to claim 10 arranged so as to make the downstream face of the shroud of said feeding member substantially coincide with the upstream face of the at least one exhaust gas purification member.

* * * * *

UNITED STATES PATENT AND TRADEMARK OFFICE
CERTIFICATE OF CORRECTION

PATENT NO. : 11,746,683 B2
APPLICATION NO. : 17/439046
DATED : September 5, 2023
INVENTOR(S) : Sommier et al.

Page 1 of 1

It is certified that error appears in the above-identified patent and that said Letters Patent is hereby corrected as shown below:

In the Claims

Claim 18, Column 19, Line 12, change "claim 13" to --claim 17--

Claim 19, Column 19, Line 21, change "claim 10" to --claim 15--

Signed and Sealed this
Third Day of October, 2023

Katherine Kelly Vidal
*Director of the United States Patent and Trademark Office*